(12) United States Patent
Kim et al.

(10) Patent No.: US 7,916,789 B2
(45) Date of Patent: Mar. 29, 2011

(54) APPARATUS, MEDIUM, AND METHOD GENERATING MOTION-COMPENSATED LAYERS

(75) Inventors: Joohee Kim, Gyeonggi-do (KR); Hyeyun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1522 days.

(21) Appl. No.: 11/242,068

(22) Filed: Oct. 4, 2005

(65) Prior Publication Data

US 2006/0072661 A1  Apr. 6, 2006

Related U.S. Application Data

(60) Provisional application No. 60/615,606, filed on Oct. 5, 2004.

(51) Int. Cl.
*H04N 11/02* (2006.01)
(52) U.S. Cl. .................. 375/240.16; 382/236; 382/238
(58) Field of Classification Search .............. 375/240.16
See application file for complete search history.

(56) References Cited

U.S. PATENT DOCUMENTS

| | | | | |
|---|---|---|---|---|
| 7,292,165 B2 * | 11/2007 | Cha et al. | ...................... | 341/107 |
| 7,653,133 B2 * | 1/2010 | Woods et al. | ............ | 375/240.13 |
| 7,788,690 B2 * | 8/2010 | Ito et al. | ............................ | 725/47 |
| 2002/0009233 A1 * | 1/2002 | Pesquet-Popescu | .......... | 382/240 |
| 2005/0047508 A1 * | 3/2005 | Ha et al. | .................... | 375/240.16 |
| 2005/0117647 A1 * | 6/2005 | Han | ......................... | 375/240.16 |
| 2005/0157794 A1 * | 7/2005 | Kim et al. | ................ | 375/240.16 |
| 2005/0169549 A1 * | 8/2005 | Cha et al. | ...................... | 382/240 |
| 2005/0195900 A1 * | 9/2005 | Han | ......................... | 375/240.21 |
| 2006/0013310 A1 * | 1/2006 | Lee et al. | ................. | 375/240.16 |
| 2006/0072661 A1 * | 4/2006 | Kim et al. | ................ | 375/240.08 |
| 2006/0088100 A1 * | 4/2006 | Han et al. | ................ | 375/240.16 |
| 2006/0120457 A1 * | 6/2006 | Park et al. | ............... | 375/240.16 |
| 2006/0133497 A1 * | 6/2006 | Park et al. | ............... | 375/240.16 |
| 2006/0133499 A1 * | 6/2006 | Park et al. | ............... | 375/240.16 |
| 2006/0182179 A1 * | 8/2006 | Han | ......................... | 375/240.16 |
| 2006/0222079 A1 * | 10/2006 | Park et al. | ............... | 375/240.16 |
| 2006/0245498 A1 * | 11/2006 | Lee et al. | ................ | 375/240.16 |
| 2007/0031052 A1 * | 2/2007 | Turaga et al. | ................ | 382/240 |

OTHER PUBLICATIONS

Van der Schaar, M., Ye, J., Andreopoulos, Y., Munteanu, A., "Fully Scalable 3-D Overcomplete Wavelet Video Coding Using Adaptive Motion Compensated Temporal Filtering", ISO/IEC JTC1/SC29/WG11 M9037, Oct. 2002, pp. 1-8.*

(Continued)

*Primary Examiner* — Sath V Perungavoor
(74) *Attorney, Agent, or Firm* — Staas & Halsey LLP (57) ABSTRACT

An apparatus, medium, and method generating a motion-compensating layer, with the apparatus including a spatial layer generator to generate an enhancement layer and a base layer, the enhancement layer including a plurality of temporally sequential video frames, and the base layer including at least one sub video frame obtained by sub sampling the plurality of video frames, and a temporal layer generator to generate at least one temporal layer corresponding to the base layer, and to generate at least one temporal layer corresponding to the enhancement layer by predicting a lower second frame using at least one of an upper second frame and an encoded first frame. The first frame may be a frame included in the at least one temporal layer corresponding to the base layer, and the second frame may be a frame included in the at least one temporal layer corresponding to the enhancement layer.

18 Claims, 4 Drawing Sheets

OTHER PUBLICATIONS

Luo, L., Li, J., Li, S., Zhuang, Z., Zhang, Y.Q., "Motion compensated lifting wavelet and its application in video coding", Multimedia and Expo, 2001. ICME 2001. IEEE International Conference on, Aug. 2001, pp. 365-368, ISBN: 0-7695-1198-8.*

Woo-Jin Han et al., "Low-delay Unconstrained Motion Compensated Temporal Filtering Technique for Wavelet-based Fully Scalable Video Coding", 2004 IEEE $6^{th}$ Workshop on Multimedia Signal Processing, pp. 478-481.

* cited by examiner

APPARATUS, MEDIUM, AND METHOD GENERATING MOTION-COMPENSATED LAYERS

CROSS-REFERENCE TO RELATED APPLICATIONS

This application claims the priority benefit of U.S. Provisional Patent Application No. 60/615,606, filed on Oct. 5, 2004 in the U.S. Patent and Trademark Office, the disclosure of which is incorporated herein in its entirety by reference.

BACKGROUND OF THE INVENTION

1. Field of the Invention

Embodiments of the present invention relate to video signal processing, and more particularly, to an apparatus, medium, and method generating a motion-compensated layer by performing temporal scalability on an enhancement layer using a frame of an encoded base layer.

2. Description of the Related Art

Video coding can be performed on frames compressed through spatial compression and/or temporal compression. Spatial compression can be performed through a discrete cosine transform (DCT) and quantization, and temporal compression can be performed through motion compensation, for example.

In video coding based on the Moving Picture Experts Group (MPEG)-2 standard, motion-compensated frames having a scalable structure are coded. Here, spatial scalability, temporal scalability, and SNR scalability are examples of scalability.

Temporal scalability can be performed by predicting a low-level frame, using an upper-level frame, for example. Forward prediction, backward prediction, and bidirectional prediction are examples of such prediction.

A conventional reproducing and/or recording apparatus, which performs temporal scalability through backward prediction (or bi-directional prediction) and encodes scalable frames, has a problem, in that video coding is delayed until frames used in backward prediction are subsequently provided to the conventional video coding apparatus.

To reduce this delay in video coding, backward prediction of some frames may be limited. However, when this is done, only a small amount of information becomes available for backward prediction, thereby lowering coding efficiency, compared to when all capabilities of backward prediction are implemented.

SUMMARY OF THE INVENTION

Embodiments of the present invention, as described herein, though not limited thereto, set forth an apparatus, method, and medium generating a motion-compensated layer by performing temporal scalability on an enhancement layer using frames of an encoded base layer.

To achieve the above and/or other aspects and advantages, embodiments of the present invention include an apparatus, including a spatial layer generator to generate an enhancement layer and a base layer, the enhancement layer including a plurality of video frames, and the base layer including at least one sub video frame obtained by sub sampling the plurality of the video frames, and a temporal layer generator to generate at least one temporal layer corresponding to the base layer, and to generate at least one temporal layer corresponding to the enhancement layer by predicting a lower second frame using at least one of an upper second frame and an encoded first frame, wherein the encoded first frame is a frame included in the at least one temporal layer corresponding to the base layer, and the upper and lower second frames are frames included in the at least one temporal layer corresponding to the enhancement layer.

The upper second frame, corresponding to the encoded first frame, may be unavailable and not utilized when predicting the lower second frame.

The encoded first frame may correspond to the upper second frame.

In addition, the temporal layer generator may include a prediction unit to generate the at least one temporal layer corresponding to the base layer by predicting a lower first frame using an upper first frame, and a selector to select the first frame, corresponding to the upper second frame to be used when predicting the lower second frame, from among a plurality of first frames, wherein the prediction unit generates the at least one temporal layer corresponding to the enhancement layer by predicting the lower second frame using the upper second frame and the selected first frame.

The temporal layer generator may further include a resampling unit to up-sample the selected first frame to equalize a resolution of the selected first frame with a resolution of a second frame, wherein the prediction unit predicts the lower second frame using at least one of the upper second frame and the up-sampled first frame.

The plurality of video frames may be temporally sequential upon generation of a motion-compensated layer using the apparatus.

To achieve the above and/or other aspects and advantages, embodiments of the present invention include a method, including generating an enhancement layer and a base layer, the enhancement layer including a plurality of video frames, and the base layer including at least one sub video frame obtained by sub sampling the plurality of the video frames, and generating at least one temporal layer corresponding to the base layer, and generating at least one temporal layer corresponding to the enhancement layer by predicting a lower second frame using at least one of an upper second frame and an encoded first frame, wherein the encoded first frame is a frame included in the at least one temporal layer corresponding to the base layer, the one sub video frame is a frame included in uppermost frames of first frames of the at least one temporal layer corresponding to the base layer, the upper and lower second frames are frames included in the at least one temporal layer corresponding to the enhancement layer, and the video frame is a frame included in uppermost frames of the at least one temporal layer corresponding to the enhancement layer.

The generating of the at least one temporal layer corresponding to the base layer may further include generating the at least one temporal layer corresponding to the base layer by predicting a lower first frame using an upper first frame, and encoding the generated at least one temporal layer corresponding to the base layer by the predicting of the lower first frame, and the generating of the at least one temporal layer corresponding to the enhancement layer further includes predicting the lower second frame using at least one of the upper second frame and the encoded lower first frame.

In addition, the generating of the at least one temporal layer corresponding to the enhancement layer may further include selecting a first frame corresponding to the upper second frame to be used in predicting the lower second frame among a plurality of first frames, and generating the at least one temporal layer corresponding to the enhancement layer by predicting the lower second frame using at least one of the upper second frame and the selected first frame.

The generating of the at least one temporal layer corresponding to the enhancement layer may further include up-sampling the selected first frame to equalize a resolution of the selected first frame with a resolution of a second frame, wherein, during the generating of the at least one temporal layer corresponding to the enhancement layer by predicting the lower second frame using the at least one of the upper second frame and the selected first frame, the lower second frame is predicted using at least one of the upper second frame and the up-sampled first frame.

The upper second frame, corresponding to the encoded first frame, may be unavailable and not utilized in predicting the lower second frame.

In addition, the encoded first frame may correspond to the upper second frame.

The plurality of video frames may be temporally sequential upon generating a motion-compensated layer using the method.

To achieve the above and/or other aspects and advantages, embodiments of the present invention include a medium including computer readable code to implement a method including generating an enhancement layer and a base layer, the enhancement layer including a plurality of video frames, and the base layer including at least one sub video frame obtained by sub sampling the plurality of the video frames, and generating at least one temporal layer corresponding to the base layer, and generating at least one temporal layer corresponding to the enhancement layer by predicting a lower second frame using at least one of an upper second frame and an encoded first frame, wherein the encoded first frame is a frame included in the at least one temporal layer corresponding to the base layer, the sub video frame is a frame included in uppermost frames of the at least one temporal layer corresponding to the base layer, the first and second frames are frames included in the at least one temporal layer of the enhancement layer, and the video frame is a frame included in uppermost frames of the at least one temporal layer corresponding to the enhancement layer.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
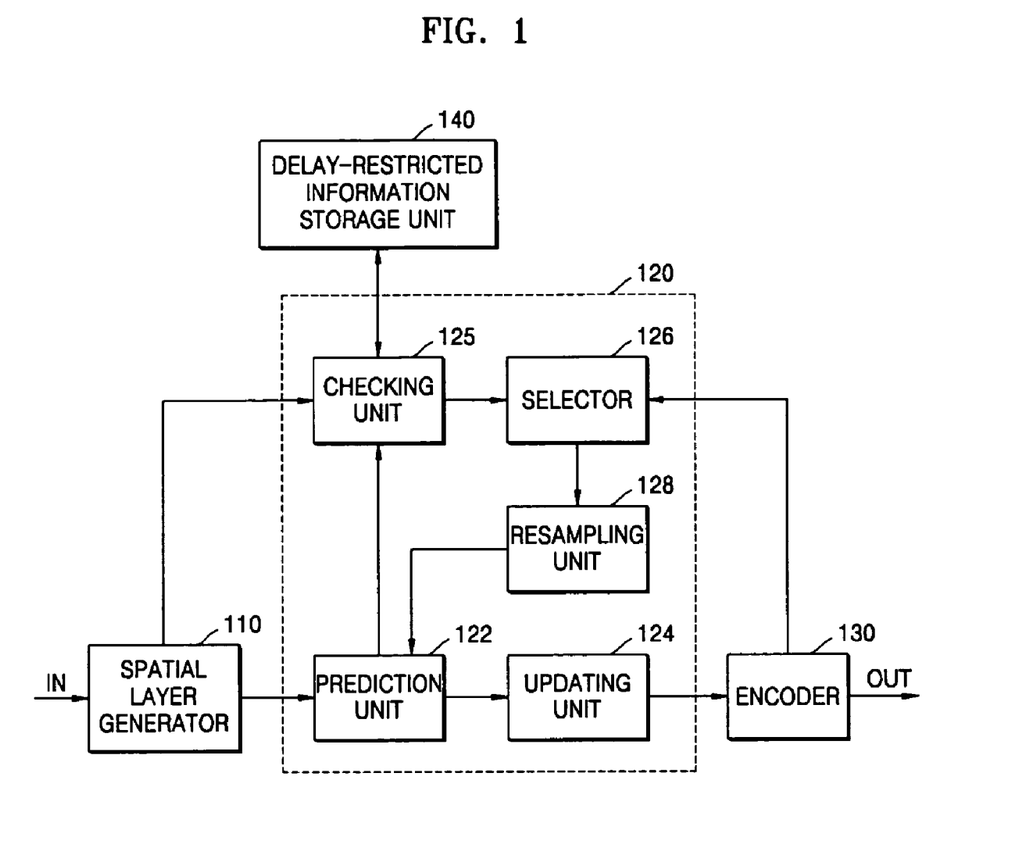
FIG. 1 illustrates an apparatus generating a motion-compensated layer, according to an embodiment of the present invention.

FIG. 1 illustrates an apparatus, such as a recording and/or reproducing apparatus, generating a motion-compensated layer, according to an embodiment of the present invention. The apparatus may include a spatial layer generator 110, a temporal layer generator 120, an encoder 130, and a delay-restricted information storage unit 140, for example. The temporal layer generator 120 may further include a prediction unit 122, an updating unit 124, a checking unit 125, a selector 126, and a resampling unit 128, for example.

In FIG. 1, "IN" denotes motion-compensated frames of a video signal, and "OUT" denotes a result, e.g., a bitstream, obtained by the encoding of the video signal.

It is noted that the spatial layer generator 110, the temporal layer generator 120, the encoder 130, and the delay-restricted information storage unit 140 may be implemented in various types of video encoding apparatuses and are not limited to the embodiment illustrated in FIG. 1. A video signal, which is to be encoded, is input to the video encoding apparatus, and the video signal may include a plurality of video frames.

Here, each video frame may contain video information captured at different instances in time. In embodiments set forth herein, a unit into which video frames are encoded by a video coding apparatus will be referred to as a Group Of Pictures (GOP).

As described above, the video coding apparatus may perform video coding on video frames compressed through spatial compression, such as through a discrete cosine transform (DCT) and quantization, and temporal compression such as motion-compensation, for example.

In particular, video coding according to Moving Picture Experts Group (MPEG)-2 standard can be performed on the IN motion-compensated frames having a scalable structure. Spatial scalability, temporal scalability, and SNR scalability are just examples of such scalability. Scalability is one of the major characteristics of MPEG-2 that are differentiated from those of MPEG-1.

The spatial layer generator 110 can perform spatial scalability on a given video signal, particularly, the IN motion-compensated frames. As a result, a plurality of spatial layers can be obtained.

More specifically, the spatial layer generator 110 may generate an enhancement layer that may include a plurality of sequential video frames, and a base layer that includes at least one sub video frame obtained by sub-sampling the plurality of the video frames.

Here, sub-sampling may be spatial sub-sampling or temporal sub-sampling, for example. Spatial sub-sampling lowers the resolution of a frame, and temporal sub-sampling reduces the number of frames included in a GOP.

The at least one sub video frame may be obtained by sub-sampling the plurality of video frames. For instance, if a video frame of 30 Hz, having a common intermediate format (CIF) according to the H.261 standard, a video frame of 15 Hz with a Quarter CIF (QCIF) may be a sub video frame. In this case, sub-sampling includes spatial sub-sampling and temporal sub-sampling.

When a frame is sub sampled to a b frame, for example, the b frame may be sub sampled to a c frame, and the c frame may be sub sampled to a d frame, e.g., a (video frame, sub video frame) may be (a frame, b frame), (b frame, c frame), or (c frame, d frame).

That is, the video frames may denote the IN motion-compensated frames, or frames obtained by sub sampling the IN motion-compensated frames.

The video frames can be included in an enhancement layer, while the sub video frames may be included in a base layer. Thus, the video frames and the sub video frames may be set forth in different layers.

The temporal layer generator 120 may generate a plurality of temporal layers corresponding to the base layer, and a plurality of temporal layers corresponding to the enhancement layer, for example. In detail, the temporal layer generator 120 may generate the plurality of temporal layers corresponding to the base layer by predicting frames of a lower layer using frames of an upper layer and updating the frames of the upper layer using the predicted frames. Likewise, the plurality of temporal layers corresponding to the enhancement layer can also be generated through frame prediction and updating. One method of generating a temporal layer through frame prediction and updating has already been disclosed in a conventional 5/3 Motion Compensated Temporal Filtering (MCTF) scheme.

Forward prediction, backward prediction, and bi-directional prediction are examples of prediction. As described above, when the temporal layer generator 120 performs temporal scalability through backward prediction (or bi-directional prediction), video coding cannot be performed until frames available for backward prediction are subsequently provided to the video coding apparatus, which may include an apparatus for generating a motion-compensated layer, according to an embodiment of the present invention, thereby delaying video coding. This problem also occurs when a temporal layer is generated according to the 5/3 MCTF scheme.

As described above, such a delay in video coding can be reduced by limiting some or all backward prediction, as disclosed in a conventional adaptive 5/3 MCTF scheme.

An apparatus for generating a motion-compensated layer, according to an embodiment of the present invention, provides a solution to both the delay in video coding when a temporal layer is generated according to the above 5/3 MCTF scheme, and the decrease in coding efficiency when a temporal layer is generated according to the above adaptive 5/3 MCTF scheme.

In other words, the temporal layer generator 120 can generate the plurality of temporal layers corresponding to the base layer, and then generate the plurality of temporal layers corresponding to the enhancement layer by predicting a lower second frame using at least one of an upper second frame and encoded first frame.

Here, the first frame can be a frame included in the plurality of the temporal layers corresponding to the base layer, and the sub video frame can be a frame included in uppermost frames of the first frames. Similarly, the second frame can be a frame included in the plurality of the temporal layers corresponding to the enhancement layer, and the video frame can be a frame included in uppermost frames of the second frames.

The encoder 130 may encode all of the first frames, and then encode all of the second frames. That is, the encoder 130 may encode all frames included in the plurality of the temporal layers corresponding to the base layer, and then encode all frames included in the plurality of the temporal layers corresponding to the enhancement layer. In this case, entropy encoding may be used, for example.

Thus, to generate the plurality of the temporal layers corresponding to the base layer, the temporal layer generator 120 may predict a frame of a lower layer most adjacent to an upper layer in the base layer, using a frame of the upper layer, and may update the frame of the upper layer using the predicted frame. As a result, it is possible to obtain a layer, as the lower layer most adjacent to the upper layer, which includes all of the predicted frames of the lower layer and a generated frame of the lower layer by the updating the frame.

After the temporal layer generator 120 generates the plurality of temporal layers corresponding to the base layer through frame prediction and updating, the encoder 130 may encode all of the generated first frames.

After the encoder 130 encodes the first frames, the temporal layer generator 120 may generate the plurality of the temporal layers corresponding to the enhancement layer. To generate the plurality of the temporal layers corresponding to the enhancement layer, the temporal layer generator 120 may predict a frame of a lower layer most adjacent to an upper layer in the enhancement layer using a frame of the upper layer, and may update the frame of the upper layer using the predicted frame. As a result, it is possible to obtain a layer, as the lower layer most adjacent to the upper layer, which includes all of the predicted frames of the lower layer and a frame of the lower layer generated by updating the frame. The encoder 130 may then encode all of the obtained second frames.

More specifically, the prediction unit 122 of the temporal layer generator 120 may predict a frame of a lower layer using a frame of an upper layer, and the updating unit 124 may update the frame of the upper layer using the predicted frame. All of the predicted frames and a frame generated by the updating of the frame, can form a lower layer most adjacent to the upper layer.

The prediction unit 122 and the updating unit 124 may generate all of the second frames or the first frames. In detail, the prediction unit 122 and the updating unit 124 can generate the plurality of the temporal layers corresponding to the base layer, and the prediction unit 122, the updating unit 124, the checking unit 125, the selector 126, and the resampling unit 128 may generate the plurality of the temporal layers corresponding to the enhancement layer.

The checking unit 125 of the temporal layer generator 120 may operate whenever the prediction unit 122 operates. Specifically, the checking unit 125 can check whether the upper second frames, which may be used for prediction of the lower second frame by the prediction unit 122, include an upper second frame unavailable for the prediction.

To check whether an unavailable upper second frame is present, the checking unit 125 may read and analyze delay-restricted information stored in the delay-restricted information storage unit 140. The delay-restricted information may contain information regarding the second frame being unavailable for backward prediction.

Alternatively, in an embodiment of the present invention, the checking unit 125 and the delay-restricted information storage unit 140 may not be utilized.

The selector 126 selects one of already encoded first frames corresponding to an upper second frame, which is to be used for prediction of the lower second frame. At this time, the selector 126 may operate in response to the checking result, output from the checking unit 125, or operate in a case where a checking unit 125 is not included or utilized.

If the selector 126 operates in response to the checking result, output from the checking unit 125, when the checking unit 125 determines that backward prediction is not allowed on some of the upper second frames to be used for prediction of the lower second frames by the prediction unit 122, the selector 126 may select one of the encoded first frames that corresponds to the instance of time when the upper second frame, which does not utilize backward prediction, is generated.

Even when the checking unit 125 determines that backward prediction is utilized or permitted on all the upper second frames to be used for prediction of the lower second frames, the selector 126 may also select encoded first frames corresponding to the upper second frame which are to be used for prediction of the lower second frame.

To generate the plurality of temporal layers corresponding to the enhancement layer, the prediction unit 122 may predict the lower second frame selectively using at least one of the encoded first frame and upper second frame.

The resampling unit 128 may up-sample the selected first frame to equalize resolution with the second frame. In this case, the prediction unit 122 may predict the lower second frame using at least one of the up-sampled first frame and the upper second frame. If the resolution of the selected first frame is equal to those of the second frames, the resampling unit 128 may not be needed, e.g., in an apparatus such as the apparatus of FIG. 1.

Figure 2:
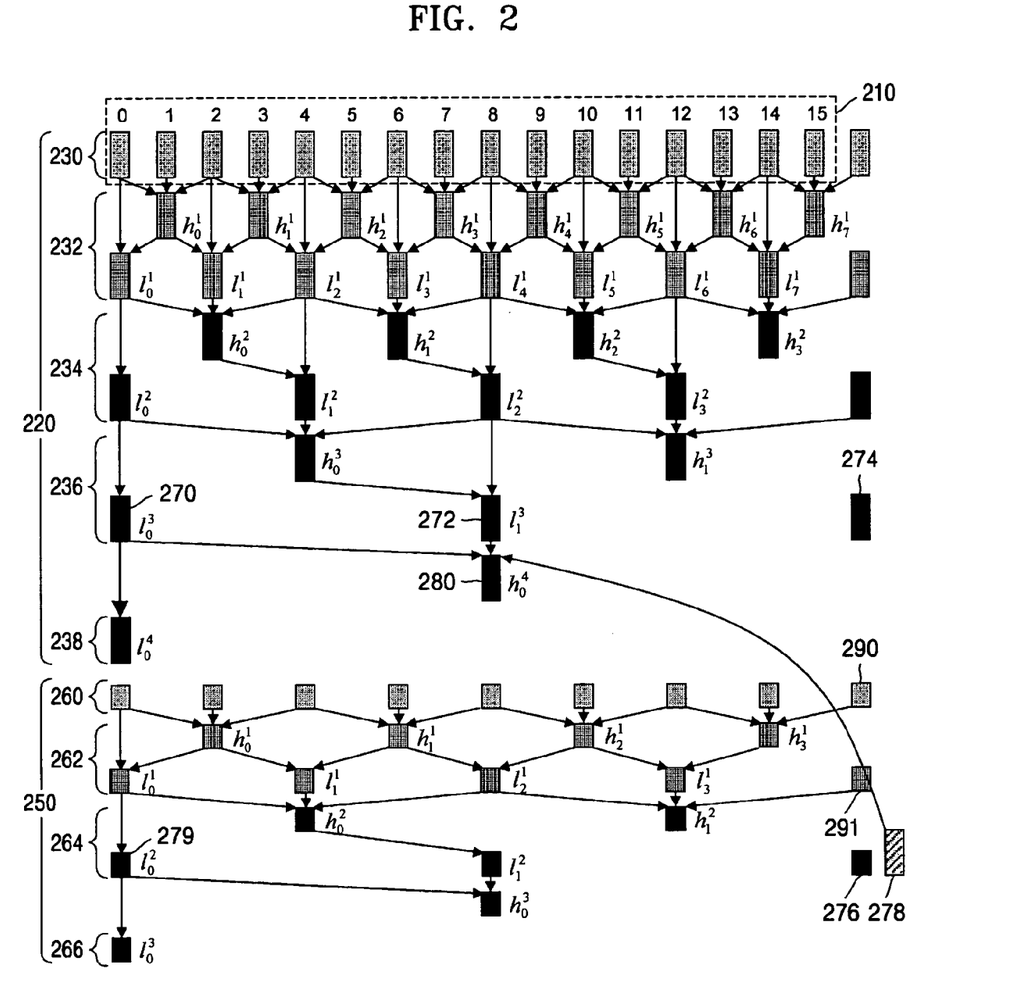
FIG. 2 is a reference diagram illustrating an implementation of a generation of a motion-compensated layer, according to an embodiment of the present invention.

FIG. 2 is a reference diagram illustrating an implementation to generate a motion-compensated layer, according to an embodiment of the present invention. In FIG. 2, reference numerals 210, 220, 230, 250, and 260 denote a GOP, an enhancement layer, video frames, a base layer, and sub video frames, respectively. Left frames of frames illustrated in FIG. 2, which belong to the same layer, temporally precede right frames thereof.

Here, the base layer 250 and the enhancement layer 220 may be spatial layers or temporal layers, for example. The enhancement layer 220 is an upper layer of the base layer 250 and can be obtained by performing spatial and temporal scalability, for example, on the base layer 250.

Reference numerals 232, 234, 236, and 238 denote a temporal layer of the enhancement layer 220, and reference numerals 262, 264, and 266 denote a temporal layer of the base layer 250.

The video frames 230 can be divided into temporal layers corresponding to the enhancement layer 220, and the sub video frames 260 can also be divided into temporal layers corresponding to the base layer 250. Here, the video frames 230 and the sub video frames 260 do not form one of the temporal layers, rather, the original frames of the video frames 230 and the sub video frames 260 are obtained by restoring all of the temporal layers.

That is, referring to FIG. 2, the enhancement layer 220 includes four temporal layers, and the base layer 250 includes three temporal layers, according to this embodiment of the present invention.

Hereinafter, for convenience of explanation, reference numerals 232, 234, 236, and 238 will be referred to as first through fourth temporal layers, respectively, and reference numerals 262, 264, and 266 will be referred to as first through third temporal layers, respectively.

Here, (Upper second frame, lower second frame) may be (video frame 230, frame of the first temporal layer 232), (frame of the first temporal layer 232, frame of the second temporal layer 234), (frame of the second temporal layer 234, frame of the third temporal layer 236), or (frame of the third temporal layer 236, frame of the fourth temporal layer 238), for example.

Similarly, (frame of the second temporal layer 264, frame of the third temporal layer 266) may be (upper first frame, lower first frame).

In FIG. 2, $h_A^B$ denotes a predicted frame, and $l_C^D$ denotes an updated frame. Predicted frames $h_A^B$ and updated frames $l_C^D$ form a temporal layer. The superscripts "B" of "$h_A^B$" or "D" of "$l_C^D$" denote an nth temporal layer ($1 \leq n \leq 4$ in the case of a temporal layer enhancement layer 220, and $1 \leq n \leq 3$ in the case of a base layer 250). The subscripts "A" of "$h_A^B$" or "C" of "$l_C^D$" denote numbers that may be sequentially allocated for respective sequential frames, according to an embodiment of the present invention, i.e., the subscript "A" may increase as time passes.

As described above, a temporal layer can be generated through frame prediction and updating. Referring to FIG. 2, the temporal layer generator 120 may predict frames using the video frames 230 and update the video frames 230 using the predicted frames (here, A can be from 0 to 7, and B=1). The first temporal layer 232 may be made up of the updated frames and the predicted frames (here, A is from 0 to 7, B=1, C is from 0 to 7, and D=1). In this case, an upper second frame may be the video frame 230, and a lower second frame may belong to the first temporal layer 232. In this case, bidirectional prediction may be used, and frames may be predicted and updated in the same manner in which a temporal layer is generated according to the above 5/3 MCTF scheme.

Likewise, the temporal layer generator 120 may predict frames using frames of the second temporal layer 234, and update the frames of the second temporal layer 234 using the predicted frames (here A=0 or 1, and B=3). The third temporal layer 236 may be made up of the updated frames and the predicted frames (here, A=0 or 1, B=3, C=0 or 1, and D=3). In this case, an upper second frame belongs to the second temporal layer 234, and a lower second frame belongs to the third temporal layer 236. In this case, bidirectional prediction may be used, and frames may be predicted and updated in the same manner in which a temporal layer is generated according to the above 5/3 MCTF scheme.

On the other hand, the temporal layer generator 120 may predict frames using frames of the third temporal layer 236 and update the frames of the third temporal layer 236 using the predicted frames (here, A=0, and B=4). The fourth temporal layer 238 may be made up of the updated frames and the predicted frames (here, C=0, and D=4). In this case, an upper second frame belongs to the third temporal layer 236, and a lower second frame belongs to the fourth temporal layer 238. In this case, forward prediction may be used and backward prediction may be limited. That is, the temporal layer generator 120 may not be capable of predicting a frame 280 using frames 270 and 274. In other words, the frame 274 may not be used as a reference frame when predicting the frame 280. Also, in this case, frames may be predicted and updated in the same manner in which a temporal layer is generated according to the above adaptive 5/3 MCTF scheme. Therefore, bidirectional prediction where backward prediction is partially limited may be used.

In one embodiment, an encoded frame 276, instead of the frame 274, may be used to predict the frame 280. Even if only backward prediction is allowed and the frame 274 is used in predicting the frame 280, both the frame 274 and the encoded frame 276 may be used in predicting the frame 280, according to an embodiment of the present invention.

That is, the temporal layer generator 120 may predict the frame 280 using an encoded first frame together with the frames 270 and 274, the encoded first frame corresponding to the frames 270 and 274, which are second frames to be used to predict the frame 280 among already encoded first frames.

In particular, if backward prediction for the frame 280, predicted using the frame 274, is limited, the temporal layer generator 120 can predict the frame 280 using the frame 276 together with the frame 270, with the frame 276 being an encoded first frame corresponding to the frame 274 which is one of the second frames to be used in predicting the frame 280.

In this case, the temporal layer generator 120 may predict the frame 280 using a frame 279 together with the frames 276 and 270, with the frame 279 being an encoded first frame corresponding to the frame 270 which is one of the second frames to be used when predicting the frame 280.

In FIG. 2, the base layer 250 may include three encoded frames 290, 291, and 276, corresponding to the frame 274, and only the frame 276 of the three encoded frames 290, 291, and 276 may be available for predicting the frame 280.

If the resolution of the frame 280 is not equal to that of the encoded frame 276, the temporal layer generator 120 may re-sample the encoded frame 276 to equalize the resolution of the frame 280 with that of the encoded frame 276.

The sub video frames 260 can be obtained by sub sampling the video frames 230. Referring to FIG. 2, the video frame 230 may be a video frame of 30 Hz having a CIF, and the sub video frame 260 may be a video frame of 15 Hz having a QCIF, for example.

That is, since the resolution of the encoded frame 276 is half the resolution of the frame 280, the resampling unit 128 of the temporal layer generator 120 up-samples the encoded frame 276. The prediction unit 122 can then predict the frame 280 using the up-sampled frame 278 and the frame 270.

Figure 3:
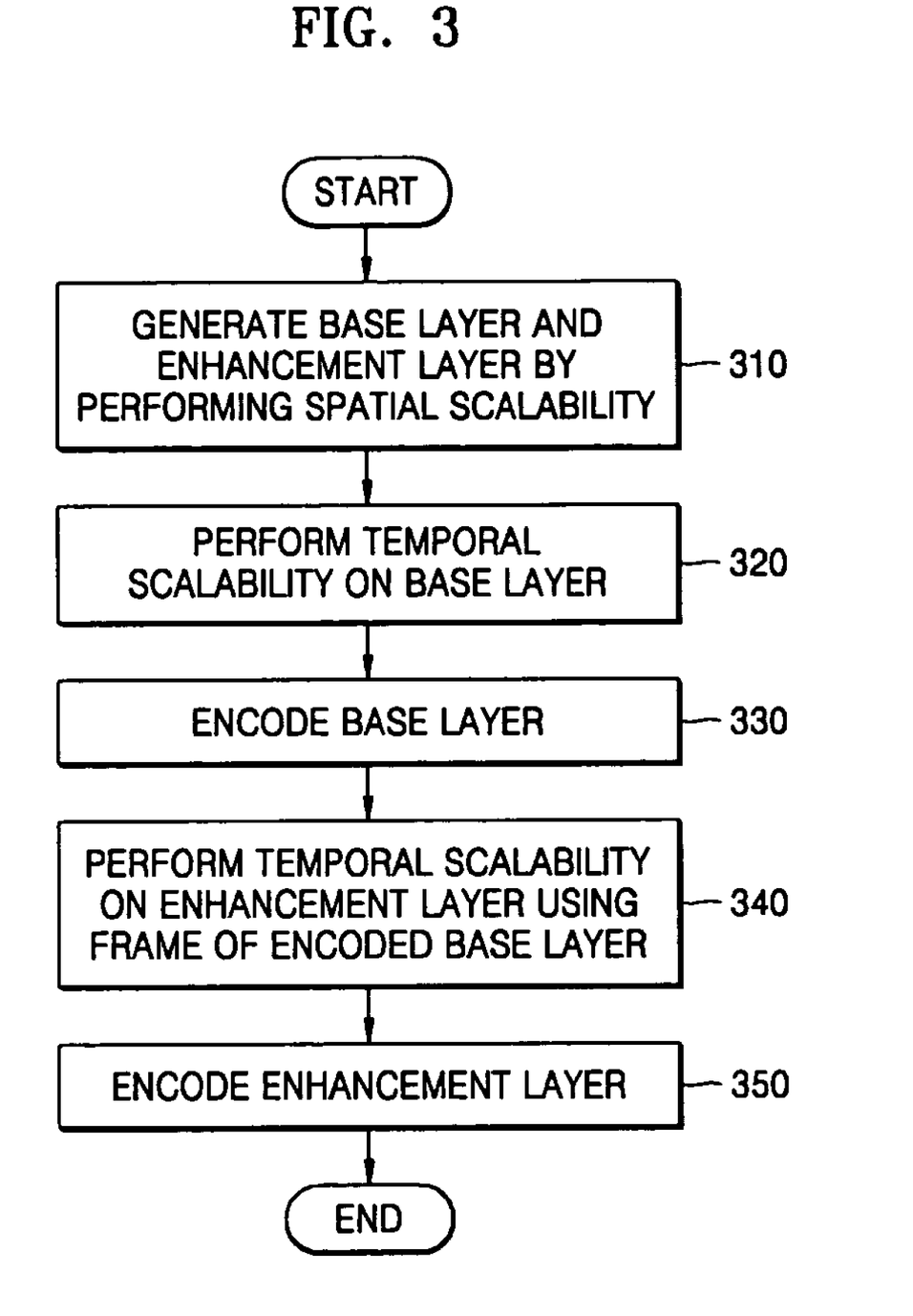
FIG. 3 is a flowchart illustrating a method of generating a motion-compensated layer, according to an embodiment of the present invention.

FIG. 3 is a flowchart illustrating a method for generating a motion-compensated layer, according to an embodiment of the present invention. The method of FIG. 3 includes performing spatial scalability on motion-compensated frames (operation 310), performing temporal scalability on a base layer and encoding the base layer (operations 320 and 330), and performing temporal scalability on an enhancement layer and encoding the enhancement layer (operations 340 and 350).

More specifically, the spatial layer generator 110 of FIG. 1, for example, may generate a base layer and an enhancement layer by performing spatial scalability on a plurality of motion-compensated time sequential video frames (operation 310).

The temporal layer generator 120 may perform temporal scalability on the base layer to obtain a plurality of temporal layers corresponding to the base layer (operation 320). Next, the encoder 130 may perform entropy coding, for example, on all of frames of the plurality of the temporal layers corresponding to the base layer, i.e., all of the first frames (operation 330).

The temporal layer generator 120 may perform temporal scalability on the enhancement layer (operation 340). In detail, the temporal layer generator 120 may perform temporal scalability on the enhancement layer using the frame of the encoded base layer, i.e., the encoded first frames.

The encoder 130 may perform entropy coding, for example, on all of frames of a plurality of temporal layers corresponding to the enhancement layer, i.e., all of second frames (operation 350).

Figure 4:
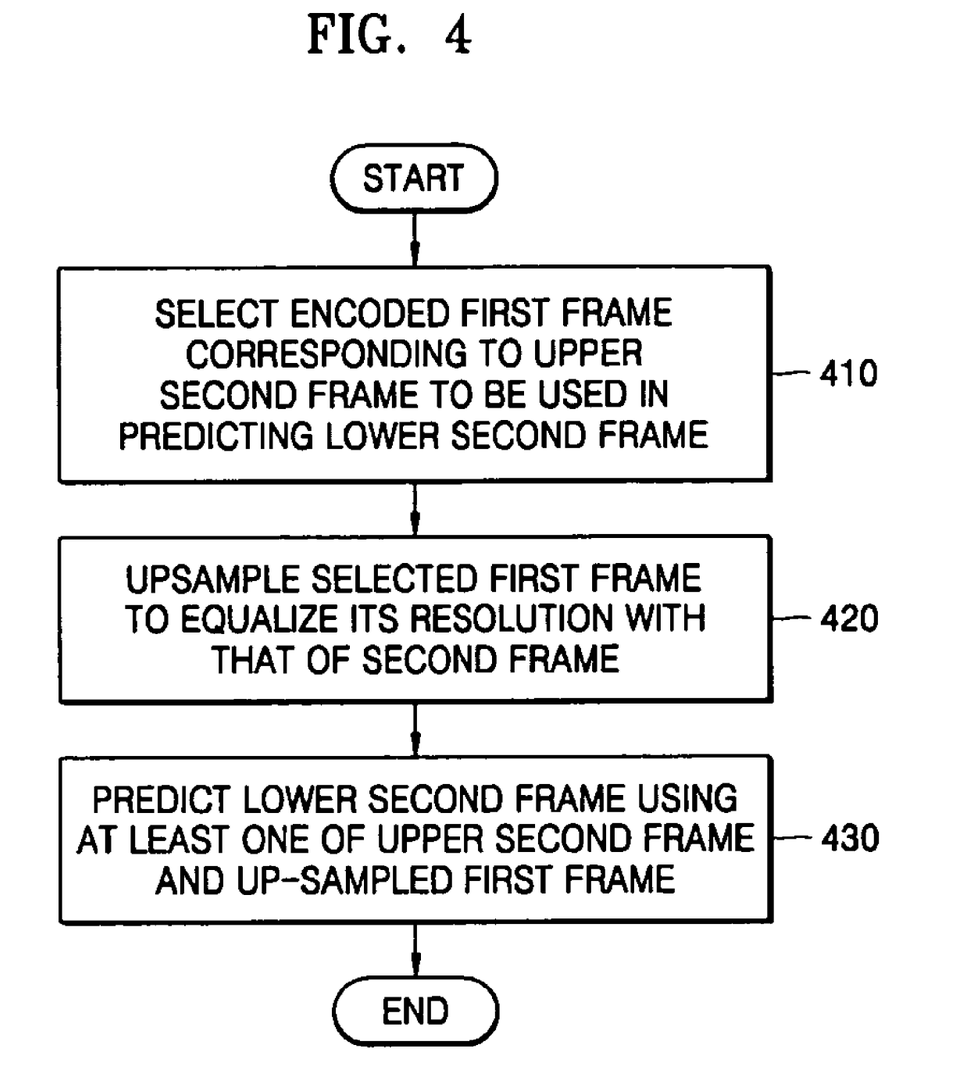
FIG. 4 is a flowchart illustrating an operation, such as operation 340 of FIG. 3, according to an embodiment of the present invention.

FIG. 4 is a detailed flowchart illustrating an operation, such as that of operation 340 of FIG. 3, according to an embodiment of the present invention. Referring to FIG. 4, operation 340 may include performing temporal scalability on the enhancement layer using the frames of the encoded base layer (operations 410 through 430).

Specifically, the selector 126 may select an encoded first frame corresponding to an upper second frame for predicting a lower second frame (operation 410). Next, the resampling unit 128 may resample the selected first frame to equalize the resolution of the selected first frame with that of the second frame (operation 420).

The prediction unit 122 may perform temporal scalability on the enhancement layer by predicting the lower second frame using at least one of the upper second frame and the re-sampled first frame (operation 430).

Embodiments of the present invention may be embodied as computer readable code in a medium, e.g., a computer readable medium. The medium may be any medium capable of storing/transferring data that is readable by a computer, e.g., a read-only memory (ROM), a random access memory (RAM), a compact disc (CD)-ROM, a magnetic tape, a floppy disk, an optical data storage device, and so on. Also, the medium may be a carrier wave, e.g., transmission of data via the Internet. The computer readable code may be distributed among computer systems that are interconnected through a network, and stored/transmitted and implemented in a distributed manner.

As described above, in an apparatus, medium, and method generating a motion-compensated layer, according to embodiments of the present invention, temporal scalability may be performed on an enhancement layer using frames of an encoded base layer, thereby minimizing degradation in coding efficiency even in an environment where bi-directional prediction is used or backward prediction is limited.

Although a few embodiments of the present invention have been shown and described, the present invention is not limited to the described embodiments. Instead, it would be appreciated by those skilled in the art that changes may be made to those embodiments without departing from the principles and spirit of the invention, the scope of which is defined by the claims and their equivalents.

What is claimed is:

1. An apparatus, comprising:
    a spatial layer generator to generate an enhancement layer and a base layer, the enhancement layer including a plurality of video frames, and the base layer including at least one sub video frame obtained by sub sampling the plurality of the video frames; and
    a temporal layer generator to generate at least one temporal layer corresponding to the base layer, and to generate at least one temporal layer corresponding to the enhancement layer by predicting a lower second frame using at least one of an upper second frame and an encoded first frame,
    wherein the encoded first frame is a frame included in the at least one temporal layer corresponding to the base layer, and
    the upper and lower second frames are frames included in the at least one temporal layer corresponding to the enhancement layer.

2. The apparatus of claim 1, wherein the upper second frame, corresponding to the encoded first frame, is unavailable and not utilized when predicting the lower second frame.

3. The apparatus of claim 1, wherein the encoded first frame corresponds to the upper second frame.

4. The apparatus of claim 1, wherein the temporal layer generator comprises:
    a prediction unit to generate the at least one temporal layer corresponding to the base layer by predicting a lower first frame using an upper first frame; and
    a selector to select the first frame, corresponding to the upper second frame to be used when predicting the lower second frame, from among a plurality of first frames,
    wherein the prediction unit generates the at least one temporal layer corresponding to the enhancement layer by predicting the lower second frame using the upper second frame and the selected first frame.

5. The apparatus of claim 4, wherein the temporal layer generator further comprises a resampling unit to up-sample the selected first frame to equalize a resolution of the selected first frame with a resolution of a second frame, wherein the prediction unit predicts the lower second frame using at least one of the upper second frame and the up-sampled first frame.

6. The apparatus of claim 1, wherein the plurality of video frames are temporally sequential upon generation of a motion-compensated layer using the apparatus.

7. A computer implemented method, comprising:

generating an enhancement layer and a base layer, the enhancement layer including a plurality of video frames, and the base layer including at least one sub video frame obtained by sub sampling the plurality of the video frames; and generating at least one temporal layer corresponding to the base layer, and generating at least one temporal layer corresponding to the enhancement layer by predicting a lower second frame using at least one of an upper second frame and an encoded first frame, wherein the encoded first frame is a frame included in the at least one temporal layer corresponding to the base layer, the one sub video frame is a frame included in uppermost frames of first frames of the at least one temporal layer corresponding to the base layer, the upper and lower second frames are frames included in the at least one temporal layer corresponding to the enhancement layer, and the video frame is a frame included in uppermost frames of the at least one temporal layer corresponding to the enhancement layer.

8. The method of claim 7, wherein the generating of the at least one temporal layer corresponding to the base layer further comprises generating the at least one temporal layer corresponding to the base layer by predicting a lower first frame using an upper first frame; and encoding the generated at least one temporal layer corresponding to the base layer by the predicting of the lower first frame;

wherein the generating of the at least one temporal layer corresponding to the enhancement layer further comprises predicting the lower second frame using at least one of the upper second frame and the encoded lower first frame.

9. The method of claim 8, wherein the generating of the at least one temporal layer corresponding to the enhancement layer further comprises:

selecting a first frame corresponding to the upper second frame to be used in predicting the lower second frame among a plurality of first frames; and generating the at least one temporal layer corresponding to the enhancement layer by predicting the lower second frame using at least one of the upper second frame and the selected first frame.

10. The method of claim 9, wherein the generating of the at least one temporal layer corresponding to the enhancement layer further comprises up-sampling the selected first frame to equalize a resolution of the selected first frame with a resolution of a second frame, wherein, during the generating of the at least one temporal layer corresponding to the enhancement layer by predicting the lower second frame using the at least one of the upper second frame and the selected first frame, the lower second frame is predicted using at least one of the upper second frame and the up-sampled first frame.

11. The method of claim 7, wherein the upper second frame, corresponding to the encoded first frame, is unavailable and not utilized in predicting the lower second frame.

12. The method of claim 7, wherein the encoded first frame corresponds to the upper second frame.

13. The method of claim 1, wherein the plurality of video frames are temporally sequential upon generating a motion-compensated layer using the method.

14. A non-transitory computer readable medium comprising computer readable code to implement a method comprising:

generating an enhancement layer and a base layer, the enhancement layer including a plurality of video frames, and the base layer including at least one sub video frame obtained by sub sampling the plurality of the video frames; and generating at least one temporal layer corresponding to the base layer, and generating at least one temporal layer corresponding to the enhancement layer by predicting a lower second frame using at least one of an upper second frame and an encoded first frame, wherein the encoded first frame is a frame included in the at least one temporal layer corresponding to the base layer, the sub video frame is a frame included in uppermost frames of the at least one temporal layer corresponding to the base layer, the first and second frames are frames included in the at least one temporal layer of the enhancement layer, and the video frame is a frame included in uppermost frames of the at least one temporal layer corresponding to the enhancement layer.

15. The medium of claim 14, wherein the plurality of video frames are temporally sequential upon generating a motion-compensated layer using the method.

16. The apparatus of claim 1, wherein the temporal layer generator up-samples the encoded first frame to equalize a resolution of the encoded first frame with a resolution of the lower second frame prior to the prediction of the lower second frame.

17. The computer-implemented method of claim 7, wherein in the generating of at least one temporal layer, the encoded first frame is up-sampled to equalize a resolution of the encoded first frame with a resolution of the lower second frame prior to the prediction of the lower second frame.

18. The non-transitory computer readable medium of claim 14, wherein in the generating of at least one temporal layer, the encoded first frame is up-sampled to equalize a resolution of the encoded first frame with a resolution of the lower second frame prior to the prediction of the lower second frame.

* * * * *